United States Patent

[11] 3,618,115

| [72] | Inventor | Komad Parsazad<br>Attarzadh Street No. 83 1st Floor, Teheran, Iran |
|---|---|---|
| [21] | Appl. No. | 842,453 |
| [22] | Filed | July 17, 1969 |
| [45] | Patented | Nov. 2, 1971 |

[54] TERRAIN PROFILE RECORDER
7 Claims, 9 Drawing Figs.

[52] U.S. Cl. ................................................. 346/7,
346/8, 346/120, 33/141.5
[51] Int. Cl. ........................................... G01c 7/04,
G01d 9/38
[50] Field of Search ............................. 346/7, 8,
118, 119, 120; 33/141.5, 220

[56] References Cited
UNITED STATES PATENTS

| 610,747 | 9/1898 | Riddell | 346/7 X |
| 616,878 | 1/1899 | Batson et al. | 346/7 X |
| 2,524,934 | 10/1950 | Silverman | 33/141.5 |
| 3,026,164 | 3/1962 | Lancerini | 346/8 |

FOREIGN PATENTS

| 3,316 | 1891 | Great Britain | 33/141.5 |
| 22,995 | 1903 | Great Britain | 33/141.5 |
| 191,437 | 1/1923 | Great Britain | 33/141.5 |
| 193,684 | 3/1923 | Great Britain | 33/141.5 |

Primary Examiner—Joseph W. Hartary
Attorney—Julian Caplan

ABSTRACT: An instrument for simultaneously measuring the slope and distance traversed by a vehicle as an aid in determining the profile of the terrain over which a vehicle is driven, having particular utility in highway construction. A beam mounted parallel to the direction of travel of a vehicle carries a pen. The beam is weighted so that it is parallel to the direction of travel and is horizontal. The pen marks chart paper which is advanced in proportion to the distance the vehicle moves and which is horizontal when the vehicle is level and tilts as the vehicle tilts. The pen marking the chart thus records the slope of the terrain and distance travelled. Damping means prevents overtravel of the pen or uneven terrain.

INVENTOR.
KOMAD PARSAZAD
BY
ATTORNEY

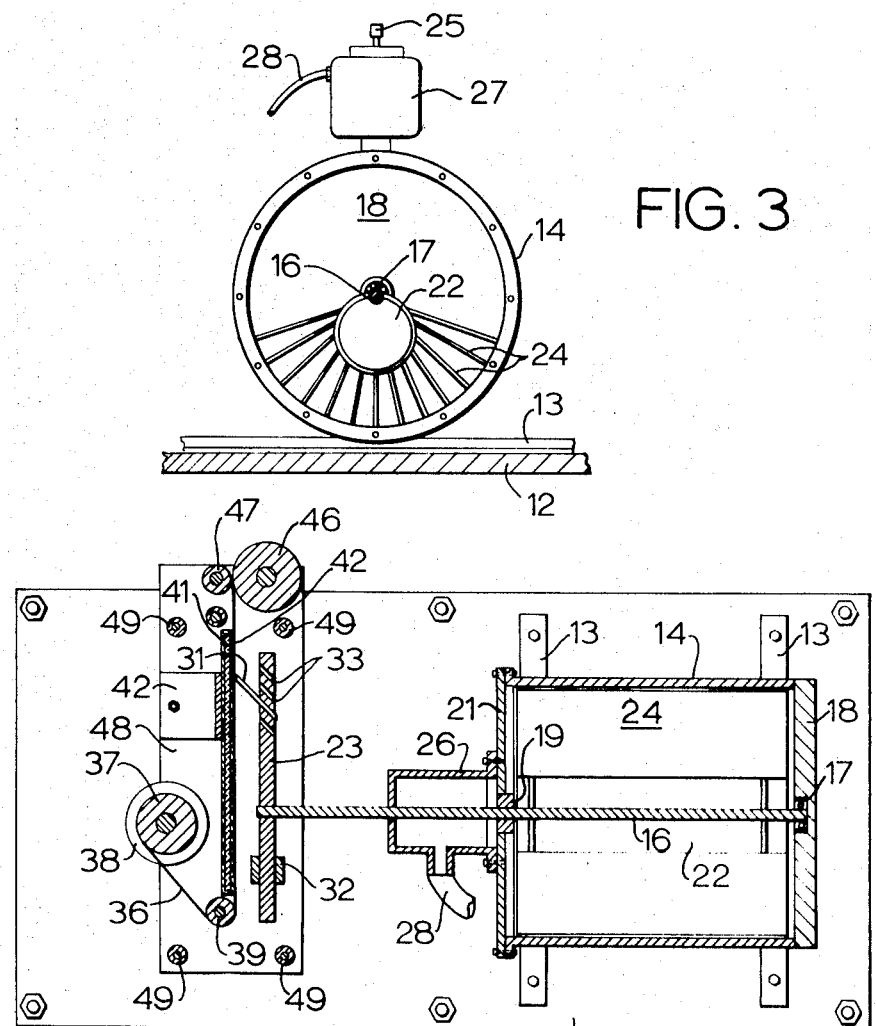
FIG. 3
FIG. 4
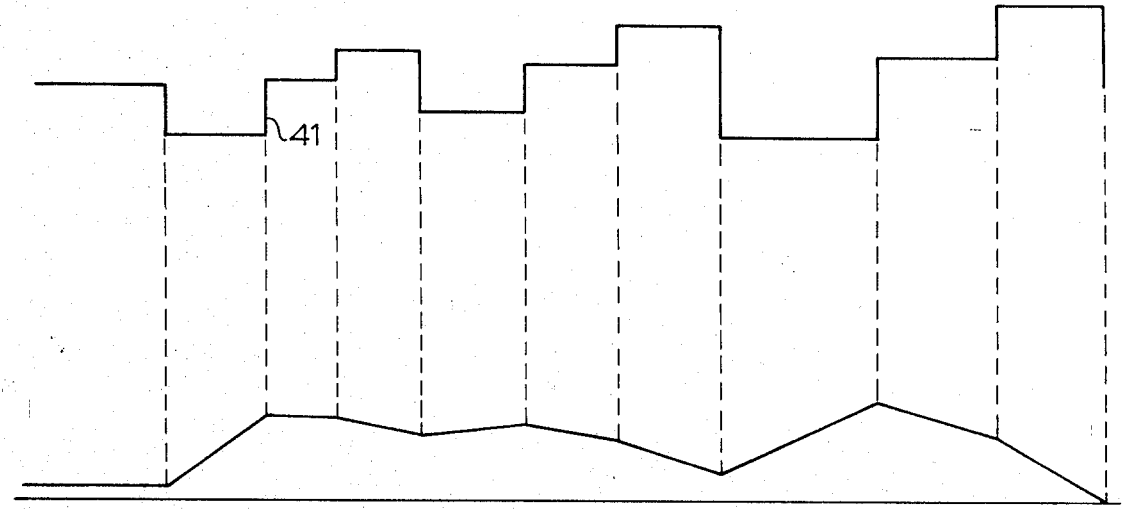
FIG. 5

TERRAIN PROFILE RECORDER

This invention relates to a new and improved instrument for computing slope of terrain and distance travelled. The invention has particular application in construction of highway and the measurement of the slope of existing highways.

Heretofore, surveying the slope of terrain has been accomplished by surveying instruments such as levels, the use of which requires skilled operators. Such operations inherently result in errors through misreading of instruments, improper positioning of rods, and other human mistakes. Furthermore, the operation is time consuming if a reasonable accuracy is to be achieved. Darkness, wind, rain and other adverse climatic conditions adversely affect such surveying. Accordingly, surveying terrain has been an expensive procedure. The present invention provides an instrument which increases precision of measurement and also makes the operation more rapid and enables less skilled labor to be employed. Wind, rain, darkness and other conditions which adversely affect existing surveying methods are not crucial in the practice of the present invention.

Essentially, the present invention provides a vehicle-mounted mechanism having a beam mounted on a shaft, which shaft is horizontal and transverse to the direction of movement of the vehicle. The shaft on which the beam is mounted is weighted so that the beam remains horizontal. Means is provided to damp oscillation of the axle to eliminate errors occurring when the vehicle is travelling over uneven terrain. The beam carries a pen which marks a web of chart paper, the chart paper being driven proportional to the distance which the vehicle moves. The chart paper tilts with the vehicle as the latter ascends and descends. Accordingly, the chart marked by the pen indicates slope and distance travelled, which makes it possible to compute the profile of the land traversed and also makes it possible to compute the amount of cut and fill required in highway construction.

In very steep terrain, where the vehicle cannot travel, the drive mechanism may be hauled by a winch or similar means and the profile thus obtained. A rope is used to advance the chart paper drive; by measuring the length of rope, the distance advanced can be measured.

Other objects of the present invention will become apparent upon reading the following specification and referring to the accompanying drawings in which similar characters of reference represent corresponding parts in each of the several views.

In the drawings:

FIG. 3 is a sectional view taken along line 3—3 of FIG. 2.

FIG. 4 is a sectional view taken along line 4—4 of FIG. 2.

FIG. 5 is a schematic diagram of a chart produced by the present invention.

Figure 1:
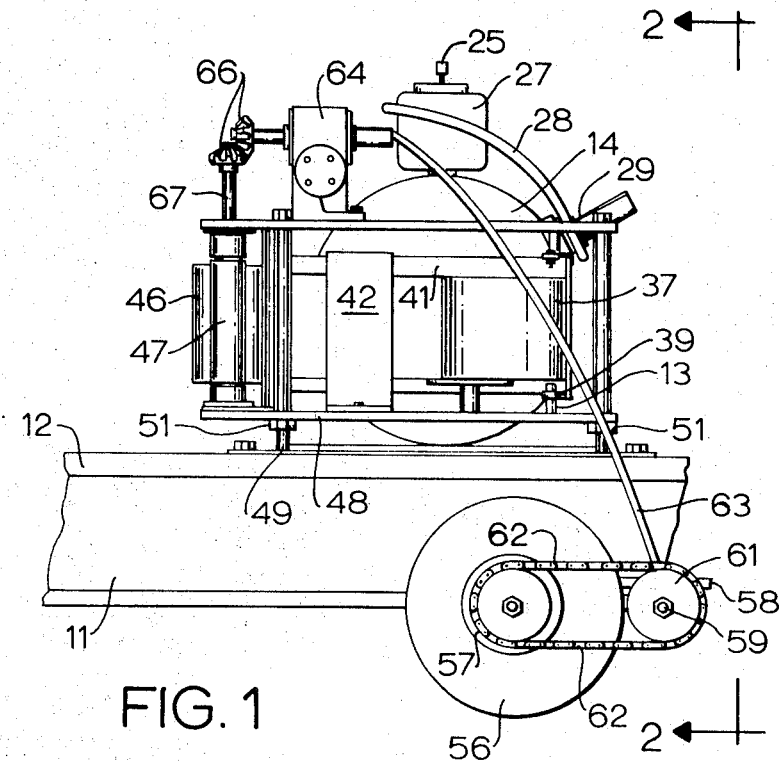
FIG. 1 is a side elevation of the device mounted on a vehicle, which is partially shown.
Figure 2:
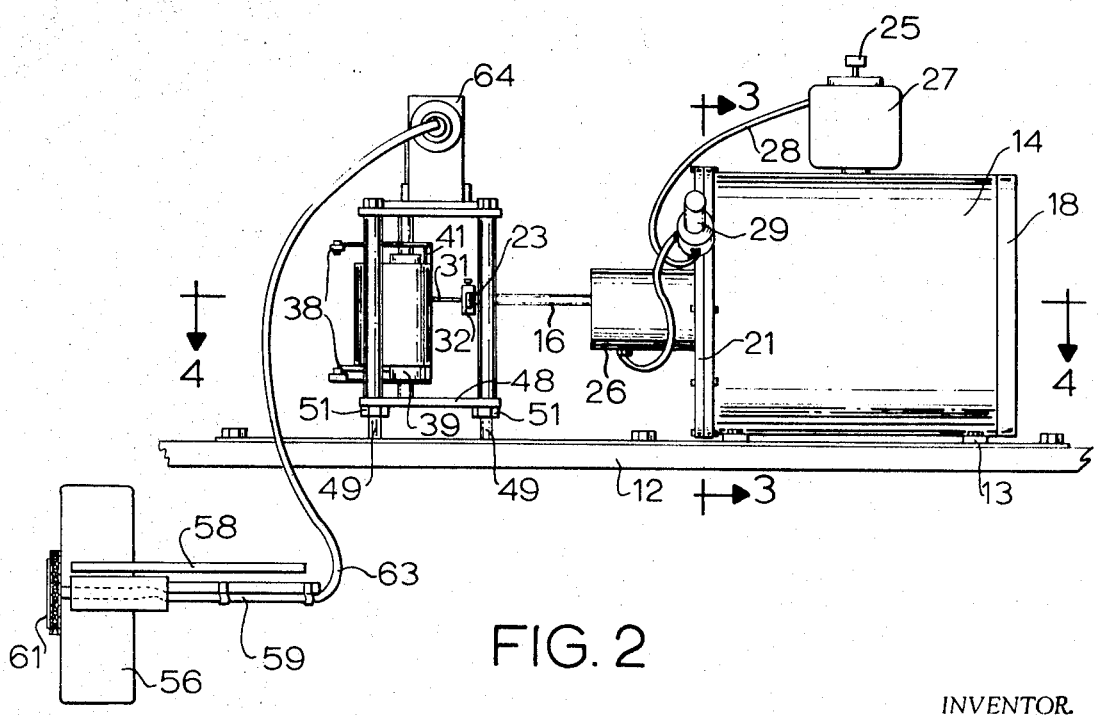
FIG. 2 is an end elevation viewed along line 2—2 of FIG. 1.
Figures 6A, 6B, 6C:
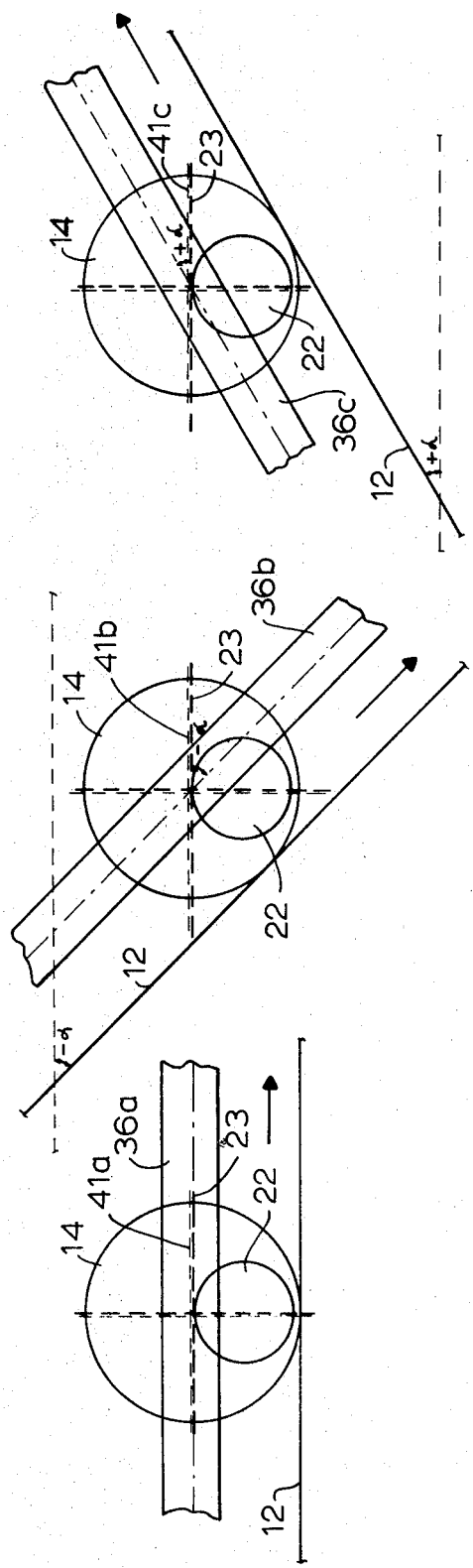

FIGS. 6A–C are schematic views showing the relationship of the markings to the chart paper when the vehicle is proceeding horizontally, descending and ascending, respectively.

Figure 7:
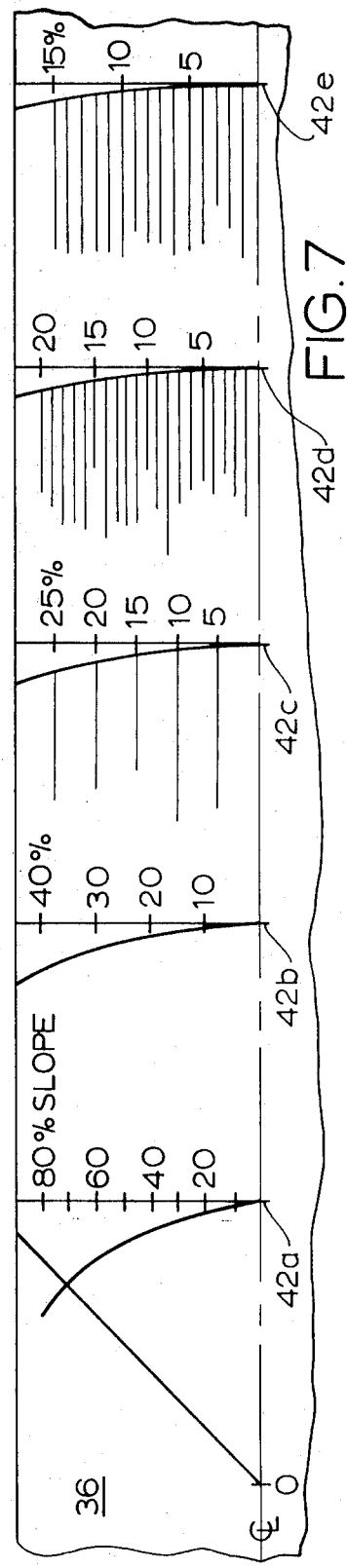

FIG. 7 is a schematic view showing how the distance of the pen making the markings from the axis of the shaft affects the reading of the chart.

The present invention is designed for use on a vehicle 11 and has a mounting plate 12 fixed into the vehicle so that the plate is horizontal when the vehicle is on level ground.

Mounted on plate 12 by means of brackets 13, is a drum 14 and extending though the drum is shaft 16 which is journaled in ball bearings 17 on one end 18 of the drum and ball bearings 19 on cover 21 which closes off the open end of the drum. Shaft 16 is located so that it is horizontal and transverse to the direction of movement of vehicle 11. Within drum 14 on shaft 16 is heavy weight 22 which is eccentric to shaft 16. Weight 22 on shaft 16 is so positioned that it is vertically below the shaft. On the exterior of drum 14 is beam 23 located so that it tends to remain horizontal. The direction of beam 23 is parallel to the direction of movement of vehicle 11. To damp oscillation of beam 23, a plurality of radiating, platelike vanes 24 are fixed to turn with shaft 16. Drum 14 is normally filled with oil and hence the vanes 24 moving in the oil damp oscillation of beam 23. To reduce friction, ball bearing 19 on cover 21 is not provided with an oil seal. Receptacle 26 is mounted surrounding shaft 16 externally of cover 21 to receive fluid which escapes through bearings 19. Mounted on top of drum 14 is a fluid storage tank 27 having relief valve 25 which replenishes oil discharged from the drum. Conduit 28 interconnects receptacle 26 and storage tank 27 and electric pump 29 installed in said conduit pumps oil from the receptacle back to the storage tank.

A pen 31 is mounted on one arm of beam 23 and the opposite arm is counterweighted by counterweight 32. Pen 31 extends through one of several apertures 33 in beam 23 which are preferably slanted at an angle of 45°. The apertures are different distances from the axis of shaft 16, the amplitude of movement of the pen being dependent on the aperture selected. The operator selects the proper aperture 33 for positioning the pen depending upon the slope which the vehicle is likely to traverse during the operation.

Chart paper 36 is provided in a roll 37 installed on vertically mounted holder 38. The paper is passed around guide roller 39 so that it extends parallel to beam 23. A platen 41 is mounted on plate 12 by means of brackets 42 so that when plate 12 is horizontal platen 41 is vertical and it is at all times parallel to the direction of the motion of the vehicle. Platen 41 may be made of glass or other hard material and is preferably surfaced with a buckram 43 or other fabric facing over which the chart paper 36 travels. Beyond platen 41 is a feed roll 46, preferably of plastic, and the paper is held in engagement with feed roll 46 by pressure roller 47, the pressure of which is adjustable. Members 36–47 are mounted on a subframe plate 48 which is supported above plate 12 by adjustment screws 49 and nuts 51 so that the level of paper 36 may be adjusted to locate the register pen 31 in the center of the chart paper 36 when the vehicle 11 is horizontal.

The paper feed roll 46 is driven from one of the vehicle wheels 56. Thus sprocket 57 is mounted to be driven by wheel 56. Adjacent the axle of wheel 56 is a mounting plate 58 on which is shaft 59 parallel to the axle and holding at one end a second sprocket 61 which is connected with the first sprocket 57 by means of chain 62. Shaft 59 is connected to a flexible shaft 63 of the type used in speedometer drives. The opposite end of flexible shaft 63 drives the input shaft of which is connected by bevel gears 66 to shaft 67 which drives feed roll 46. Preferably, the gear box 64 is provided with interchangeable gears so that the distance which the chart paper 36 is moved, although proportional to the distance traversed by the vehicle, may be adjusted depending upon the type of survey being conducted.

It will be understood that the vehicle chassis 11 is parallel to the road over which the vehicle travels. When the road is horizontal, plate 12 is also horizontal. When the vehicle climbs at an angle alpha upwardly, plate 12 makes an angle with the horizontal which is also equal to alpha, whereas if the road slopes downwardly the plate makes a negative angle alpha with the horizontal. The force of gravity causes beam 23 to remain horizontal despite the angle of the vehicle. The product of the distance moved by the vehicle and the slope which the vehicle traverses is equal to the difference between the original and final elevation. Thus, if the slope if 2 percent and the distance traversed is 100 meters, the difference in elevation between the initial and final point is 2 meters. Since the chart paper 36 is so mounted that it tilts depending upon the slope which the vehicle is traversing and since the beam 23 and thus the position of the pen 31 are horizontal regardless of slope, the variation of the line marked by the pen from the center of the first paper indicates the slope being traversed. If the vehicle is proceeding over horizontal ground, the pen will mark the center of paper 36 but when the vehicle is climbing or descending the pen will move corresponding distances away from the center of the paper and the amount of variation is dependent upon the degree of slope. Further, the length of the movement of the paper 36 is proportional to the distance which the vehicle travels. Hence, the difference in elevation of the initial and final points can be calculated.

It will be noted that the drum 14 is cylindrical for the reason that the motion of a pendulum 22 is a circular arc. The internal weight 22 is preferably also cylindrical. The cylindrical enclosure or drum 14 is fixed on plate 12 and with the change in the angle of the plate 12 the drum 14 also changes position but the internal weight 22 remains like a plumb-line under gravitational force about the cylinder axis and does not vary with the change of position. The beam 23 is likewise perpendicular to shaft 16 and thus remains in horizontal position. The vanes 24 at the side of and above the weight immersed in hydraulic fluid of suitable viscosity ensures that the weight 22 will rotate slowly about shaft 16 as the vehicle changes its slope but the vanes 24 inside the cylinder operating on the liquid reduce the motion. When there is a sudden shock such as passing over a bump, the tendency of weight 22 to oscillate like a pendulum is overcome by the damping effect of the vanes in the liquid. However, the slight oscillation which results will indicate to one reading the chart produced by the instrument that there is a bump which requires repair. Pump 29 ensures that the drum is always filled with liquid and hence the damping effect is constant.

FIG. 5 at the top illustrates schematically representative markings 41 of pen 33 on chart paper 33. At the lower part of this figure is shown the actual terrain computed by reference to the pen markings and distance traversed, from which the slope of the terrain is computed.

FIG. 6A shows schematically that when the vehicle is proceeding horizontally, plate 12 and hence chart paper 36a are horizontal. Beam 23, under the influence of weight 22, is also horizontal, as is the marking 41a of the pen. When the vehicle is descending, as in FIG. 6B, plate 12 and paper 36b slant downward. Beam 23 remains horizontal. The pen marking 41b is an ascending line on paper 36. When the vehicle is ascending, as in FIG. 6C, chart 36 slants upward while the marking 41c slants downward on paper 36c.

FIG. 7 illustrates how the slope is computed when the pen is positioned in different holes 33 in beam 23 at different radii from the axis 0 of shaft 16. The first scale 42a is for the shortest radius, e.g., 5 cm. By measuring on scale 42a the distance of the pen marking from the longitudinal center line of paper 36, the slope percentage is read. If the marking were below the center line, a similar scale would be used. Scale 42b is used when the radius or distance of the pen from the axis of shaft 16 is twice that of scale 42a. Similarly scales 42c, 42d, and 42e are at equally increasing radii. The greater the radius, the greater the accuracy of the reading.

What is claimed is:

1. A terrain profile measuring apparatus for mounting on a vehicle comprising, a base, means for mounting said base on a vehicle with said base horizontal when said vehicle is horizontal and also aligned relative to the direction of travel of said vehicle, a shaft, means pivotally mounting said shaft parallel to said base and transverse to said direction of travel, a beam fixed on one end of said shaft and oscillating about the axis of said shaft in a plane parallel to said direction of travel, a pen on said beam, a weight fixed below said shaft tending to keep said beam parallel to said base, chart drive means on said base including means for guiding a chart past said pen in a direction parallel to said base and to said direction of travel, drive means adapted for connection to a wheel of said vehicle for driving said chart drive means proportional to the distance traversed by said vehicle, a drum mounted on said base and surrounding a portion of said shaft and said weight, said drum enclosing fluid, and vanes in said drum rotatable with said shaft.

2. Apparatus according to claim 1 which further comprises damping means damping oscillation of said beam.

3. Apparatus according to claim 1 which further comprises a receptacle collecting fluid leakage from said drum around said shaft, a tank for fluid communicating with said drum to maintain said drum full of fluid, and a pump to return fluid from said receptacle to said tank.

4. Apparatus according to claim 1 in which said vanes extend radially relative to said shaft from the periphery of said weight.

5. Apparatus according to claim 1 in which said beam is apertured in a plurality of holes and said pen selectively fits in any of said holes, whereby the distance of said pen from said shaft may be varied.

6. Apparatus according to claim 1 which further comprises a subframe parallel to said base, said chart drive means being mounted on said subframe and means to adjust the distance of said subframe from said base to center of said pen relative to the center of said chart.

7. Apparatus according to claim 1 in which said chart drive comprises a platen mounted perpendicular to said base and parallel to said direction, a chart paper roll, guide means to guide paper from said chart paper roll along said platen to be contacted by said pen, a paper drive roll, said drive means turning said paper drive roll to draw paper past platen proportional to movement of said vehicle.

* * * * *